(12) United States Patent
Smith (10) Patent No.: US 6,382,647 B1
(45) Date of Patent: May 7, 2002

(54) TRAILER APPARATUS

(76) Inventor: Rodney D. Smith, 2152 San Juan Cir., St. George, UT (US) 84790

( * ) Notice: Subject to any disclaimer, the term of this patent is extended or adjusted under 35 U.S.C. 154(b) by 0 days.

(21) Appl. No.: 09/570,851

(22) Filed: May 12, 2000

(51) Int. Cl.[7] .................................................. B62D 7/18
(52) U.S. Cl. .............................. 280/93.512; 280/86.758
(58) Field of Search ........................... 280/407.1, 418.1, 280/442, 443, 86.75, 86.758, 86.751, 124.158, 93.512, 137.506

(56) References Cited

U.S. PATENT DOCUMENTS

| | | | | |
|---|---|---|---|---|
| 1,268,933 A | * | 6/1918 | Cox ....................... | 280/93.512 |
| 1,398,588 A | * | 11/1921 | Eccard | |
| 2,151,870 A | * | 3/1939 | Raven | |
| 2,351,846 A | * | 6/1944 | Swim et al. | |
| 2,449,863 A | * | 9/1948 | Ross | |
| 3,180,510 A | * | 4/1965 | Moller | |
| 4,109,811 A | * | 8/1978 | Stucky | |
| 4,325,541 A | * | 4/1982 | Korosladanyi et al. ................... | 280/124.158 |
| 4,369,983 A | * | 1/1983 | Charek | |
| 4,534,575 A | * | 8/1985 | Grove et al. ........... | 280/93.512 |
| 4,706,987 A | * | 11/1987 | Pettibone et al. | |
| 4,824,135 A | * | 4/1989 | Mcgregor ................... | 280/442 |
| 4,934,733 A | * | 6/1990 | Smith et al. | |
| 4,955,630 A | * | 9/1990 | Orgen | |
| 5,114,178 A | * | 5/1992 | Baxter | |
| 5,169,166 A | * | 12/1992 | Brooks | |
| 6,027,129 A | * | 2/2000 | Kleinschmit et al. .. | 280/86.758 |
| 6,068,276 A | * | 5/2000 | Kallstrom | |

* cited by examiner

Primary Examiner—J. J. Swann
Assistant Examiner—Christopher Bottorff
(74) Attorney, Agent, or Firm—H. Gordon Shields, Esq.; Morriss, Bateman, O'Bryant & Compagni, P.C.

(57) ABSTRACT

Trailer apparatus includes pneumatic shock absorber assemblies for absorbing road shocks as the trailer moves and for raising and lowering the trailer evenly. The trailer apparatus also includes king pin assemblies which may be moved relative to wheel spindles for enhanced steering while the trailer is being pulled and while the trailer is being backed up. Three embodiments of king pin assemblies and two embodiments of pneumatic shock absorber assemblies are disclosed.

11 Claims, 6 Drawing Sheets

TRAILER APPARATUS

BACKGROUND OF THE INVENTION

1. Field of the Invention

This invention relates to trailers and, more particularly, to apparatus for steering trailers and for raising and lowering trailers.

2. Description of the Prior Art

U.S. Pat. No. 1,398,588 (Eccard) discloses a steering apparatus for a vehicle. Steering wheel geometry is illustrated.

U.S. Pat. No. 2,151,870 (Raven) discloses a trailer which may be raised and lowered using hydraulic cylinders.

U.S. Pat. No. 2,351,846 (Swim et al) discloses a trailer having a bed which is raised and lowered through linkage and the use of a single hydraulic cylinder.

U.S. Pat. No. 2,449,863 (Ross) discloses trailer apparatus using a hydraulic cylinder and structural linkages for raising and lowering the load carrying frame of a trailer.

U.S. Pat. No. 3,180,510 (Mollar) discloses a trailer for hauling a golf buggy. The trailer raises and lowers for loading and unloading a golf cart. It is actually the rear end of the trailer which tilts in response to hydraulic actuating cylinders. The tilting or movement of the trailer is accomplished by retracting its two wheels.

U.S. Pat. No. 4,109,811 (Stucky) discloses a trailer with a portion that is lowered by utilizing a pivoting arrangement between adjacent pairs of wheels. The adjacent pairs of wheels include a pivot axis and a second portion of the trailer apparatus also includes a pivot axis which allows a portion of the trailer bed to be lowered.

U.S. Pat. No. 4,706,987 discloses steering wheel geometry for a vehicle.

U.S. Pat. No. 4,934,733 discloses steering apparatus in a trailer.

U.S. Pat. No. 4,955,630 (Ogren) discloses a fifth wheel trailer steering mechanism. The steering mechanism includes a slide which is selectively engaged with and retracted from the fifth wheel of a tractor. Specific king pin geometry is disclosed.

U.S. Pat. No. 5,169,166 (Brooks) discloses steering apparatus for a skate board and the like. A steering apparatus is actuated by tilting of a board relative to the wheel and axle elements.

None of the patents described above includes elements for allowing the king pin of a trailer to move from a forward or positive caster to a negative caster for simplifying the steering of a trailer while the trailer is being backed.

Some of the patents disclose elements for raising and lowering trailer beds, but none of them include the simplified system illustrated in the apparatus of the present invention.

SUMMARY OF THE INVENTION

The invention described and claimed herein discloses trailer apparatus having pneumatic shock absorbers which perform a dual function of absorbing road shocks and of raising and lowering the trailer bed. The trailer apparatus also includes king pin elements which move between positive and negative caster to provide stability and ease of backing the trailer.

Among the objects of the present invention are the following:

To provide new and useful trailer apparatus;

To provide new and useful trailer apparatus having a bed which is able to be raised and lowered as desired;

To provide new and useful trailer apparatus having king pins movable between positive and negative caster;

To provide new and useful trailer apparatus having a tilting king pin assembly;

To provide new and useful trailer apparatus having a sliding king pin assembly; and To provide new and useful trailer apparatus utilizing pneumatic shock absorbers for raising and lowering the bed of a trailer and having king pin assemblies movable between positive and negative caster inclinations to facilitate traileving and the backing of the trailer.

DESCRIPTION OF THE PREFERRED EMBODIMENT

Figure 1:
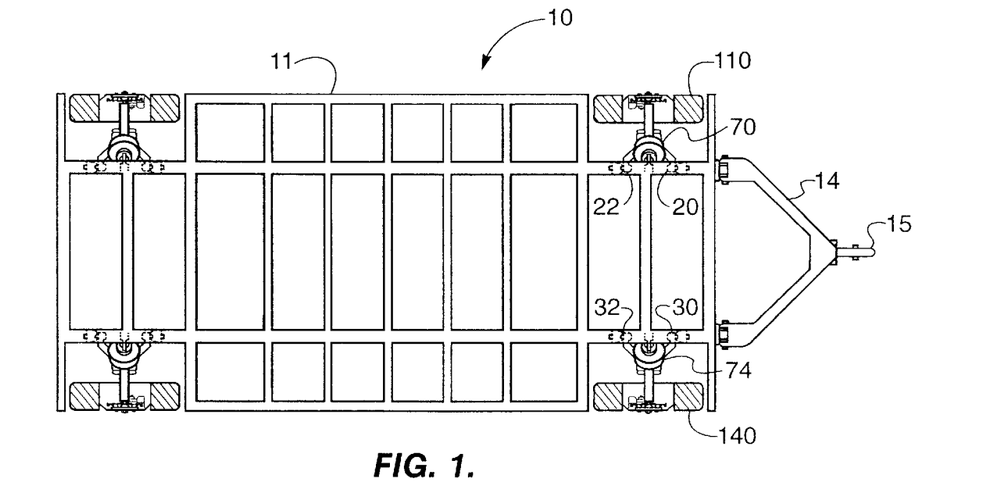
FIG. 1 is a top plan view of a portion of the apparatus of the present invention.
Figure 2:
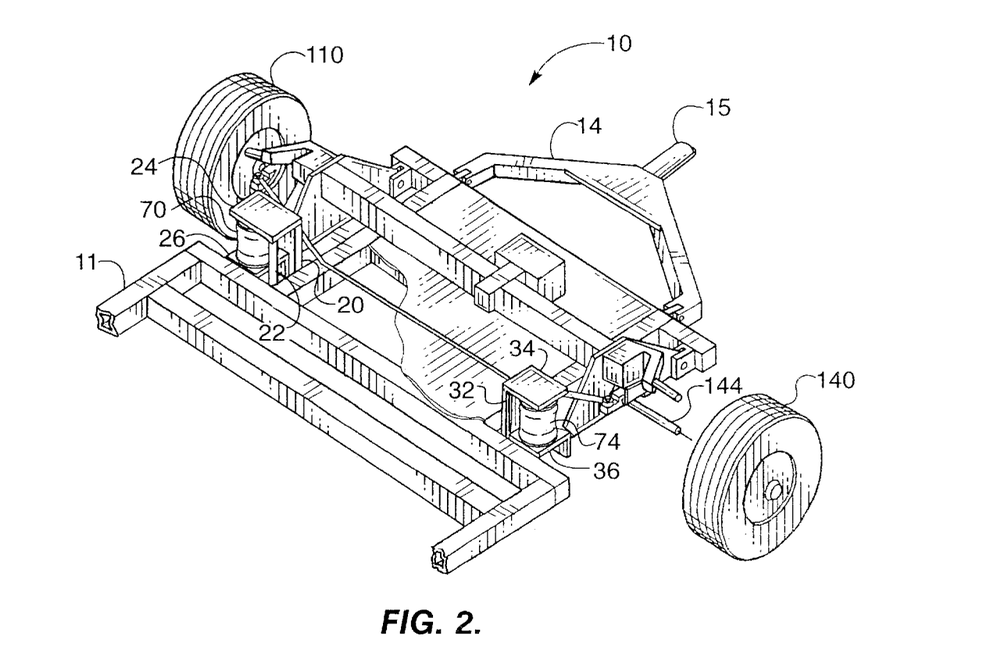
FIG. 2 is a perspective exploded view of a portion of the apparatus of the present invention.
Figure 3:
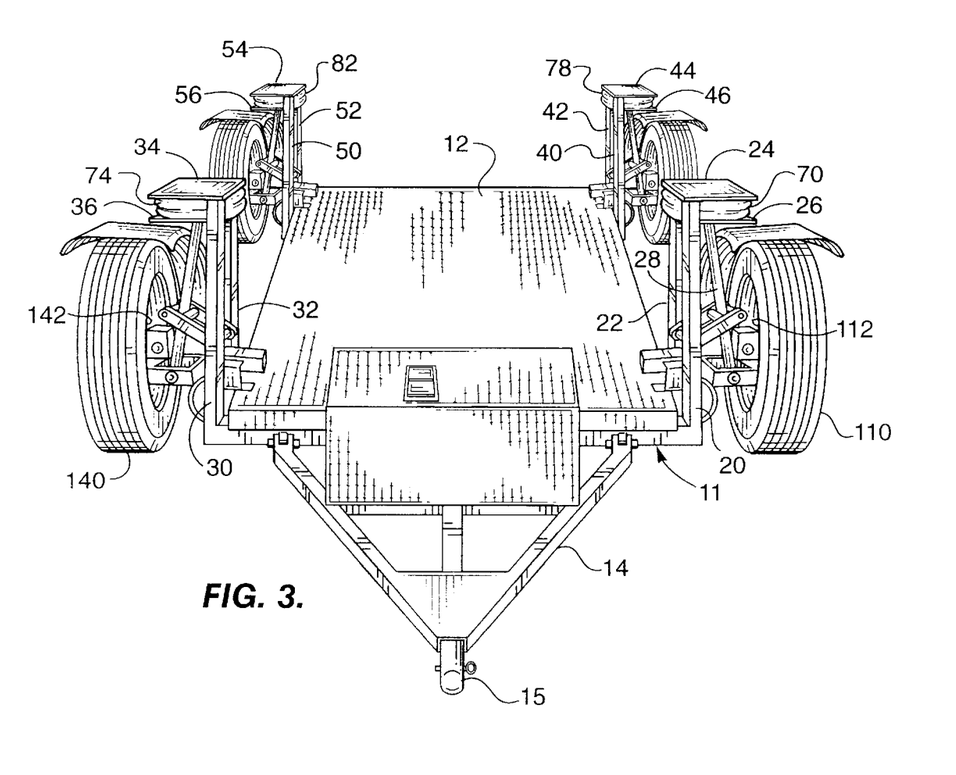
FIG. 3 is a perspective view of the apparatus of the present invention.
Figure 4:
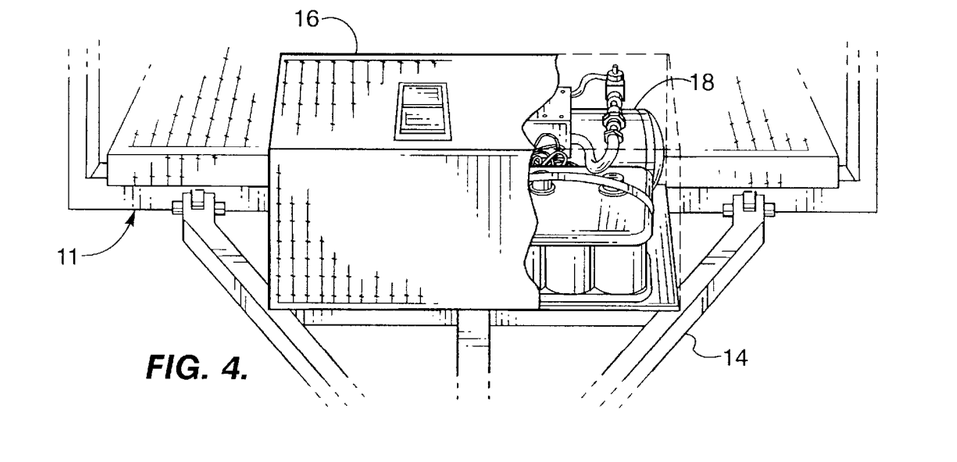
FIG. 4 is a perspective view of the front portion of the apparatus of the present invention showing some of the control elements.

FIG. 1 is a top plan view of trailer apparatus 10 embodying the present invention. FIG. 2 is an exploded perspective view of a portion of the trailer apparatus 10. FIG. 3 is a front, upper perspective view of the trailer apparatus 10, and FIG. 4 is a perspective view of the front portion of the trailer apparatus 10. For the following discussion, reference will be made to FIGS. 1, 2, 3, and 4. Note that for clarity, some elements have been omitted from the various Figures.

The trailer apparatus 10 includes a bed or platform 12 on which a load will be disposed. The bed is on a frame 11. Extending outwardly frontwardly from the bed or platform 12 is a tongue 14. The tongue includes a trailer hitch for hitching the trailer apparatus 10 to a towing vehicle. Disposed on the tongue 14 adjacent to the bed or platform 12 is a control box 16. The control box 16 is a housing for the various control elements for the apparatus of the present invention.

As will be known and understood, the bed or platform 12 is disposed on the frame 11, and the tongue 14 extends outwardly from the frame 11, and is appropriately secured thereto. Since the trailer frame 11 and bed 12 move up and down, the tongue 14 is pivotally connected to the frame 11 which supports the bed 12. The pivoting connection may be a simple yoke and pin connection, well known and understood.

The trailer apparatus 10 is illustrated as having four wheels. Each wheel includes a rim and a tire. The rear wheels are secured to an axle or to axle stubs, while the front wheels move for steering both forwardly and rearwardly. Essentially, the wheels caster on king pins to facilitate steering when the trailer 10 is pulled and when the trailer 10 is moved rearwardly. Adjacent to each of the four wheels are tubing elements and a plate for supporting pneumatic shock absorbers. As indicated earlier, the pneumatic shock absorbers provide two functions, namely the function of absorbing road shocks as the trailer apparatus 10 is towed, and the function of raising and lowering the frame 11 and bed 12, as desired. Relative to the wheels and to the surface on which the wheels are disposed.

Figure 5:
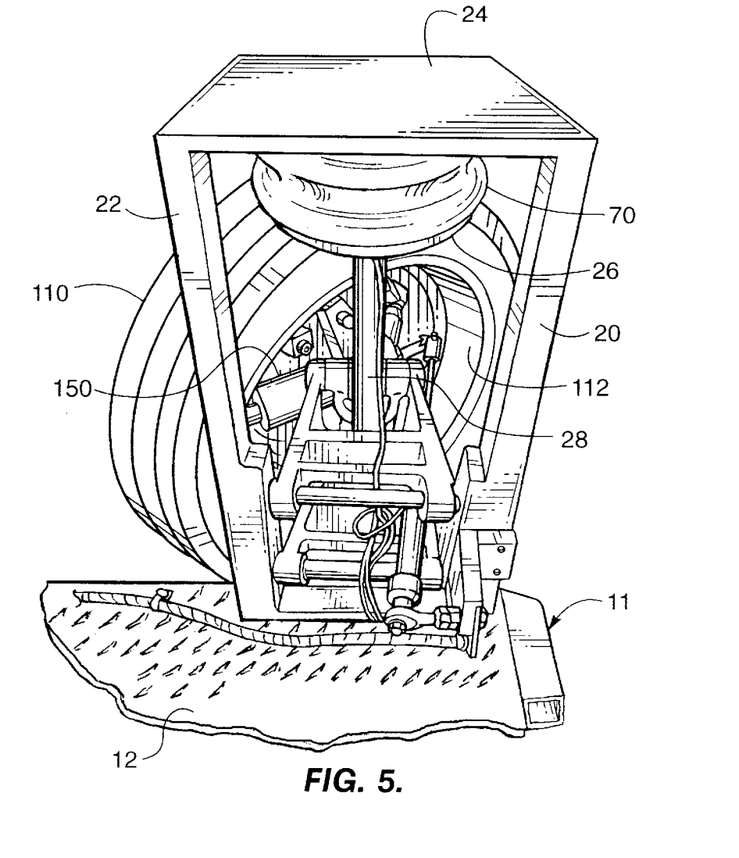
FIG. 5 is a perspective view of a portion of the apparatus of the present invention.

The shock absorber elements are illustrated best in FIGS. 3 and 5, although reference may also be made to FIGS. 1, and 2 for the following discussion.

At the front of the trailer apparatus 10 is a tubing element 20 and a tubing element 22 to which a plate 24 is secured. On the opposite side of the trailer, and parallel to the tubing elements 20, 22 and plate 24, are tubing elements 30 and 32 and a plate 34. The plates 24 and 34 are appropriately secured, as by welding, to the tubing elements 20, 22, and 30, 32, respectively.

At the rear of the trailer apparatus 10, adjacent to the rear wheels, are tubing elements 40 and 42 and a plate 44 secured thereto, and tubing elements 50 and 52 with a plate 54 secured thereto. The tubing elements 40, 42, and the plate 44 are generally parallel to the tubing elements 50, 52, and the plate 54.

Spaced apart from plate 24 is a plate 26. The plate 26 is appropriately secured to a rod 28 which extends downwardly to the wheel assembly. The wheel assembly will be discussed in detail below.

Spaced apart from the plate 34 is a plate 36. A rod 38 is appropriately secured to the plate 36 and extends downwardly to its wheel assembly. Spaced apart from the plate 44 is a plate 46. The plate 46 is secured to a rod 48, and the rod 48 extends downwardly to its wheel assembly.

Finally, spaced apart from the plate 54 is a plate 56. The plate 56 is secured to a rod 58, and the rod 58 extends downwardly to its wheel assembly.

Disposed between the plates 24 and 26 is a shock absorber element 70. A conduit 72 (see FIG. 5) extends from the control box 16 to the shock absorber element 70. A shock absorber element 74 is disposed between the plates 34 and 36. A conduit (not shown) extends from the control box 16 to the shock absorber element 74. A shock absorber element 78 is disposed between the plates 44 and 46. A conduit (not shown) extends from the control box 16 to the shock absorber element 78. Finally, a shock absorber element 82 is disposed between the plates 54 and 56. A conduit 84 extends from the control box 16 to the shock absorber element 82.

The shock absorber elements 70, 74, 78, and 82 are essentially expansible chamber elements which are inflated as desired to raise the frame 11 and bed 12 evenly and deflated to lower the frame 11 and bed 12 evenly for loading the trailer and adjusted as desired to raise or lower the trailer bed for traveling. The elements 70, 74, 78, and 82 may also be inflated to provide the desired stiffness or shock absorbing characteristics for absorbing road shocks as the trailer apparatus 10 is towed. The respective conduits, such as the conduit 72, extend to control elements, including appropriate valves and an air compressor and associated storage tank 18 in the control box 16 (see FIG. 4) for controlling the flow of air into and out of the shock absorber elements.

In addition to the shock absorber elements which serve to raise and lower the trailer 10 and to absorb road shocks as the trailer moves, there are king pins associated with the front wheels which move forwardly and rearwardly to allow the front wheels to caster for proper trailering when the trailer is moved forward and for backing when the trailer is moved backwards. Three embodiments of adjustable king pins are illustrated and discussed herein.

The purpose of the movement of the king pins is to manipulate tire patch pressure by moving the king pins to either a forward or backward position relative to the spindle axis of the wheels relative to the direction of travel. That is, the movement of the king pin adjusts the tire patch pressure to behind the kin pin relative to the desired direction of travel. That is, for best trailering, a majority of the tire patch pressure should be behind the king pin, in relation to the direction of travel. The king pin axis is moved forward of the spindle axis for normal forward trailering, and rearward of the spindle axis for backing up the trailer. This will be discussed below.

Figure 6:
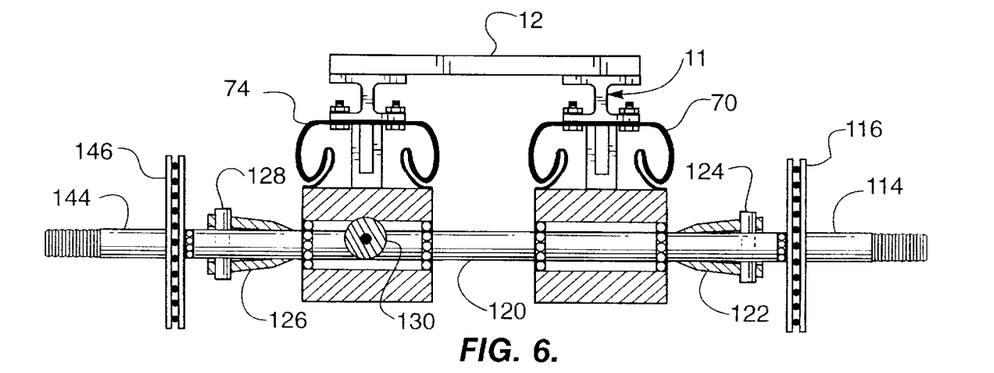
FIG. 6 is a front view of a portion of the apparatus of the present invention.
Figure 7:
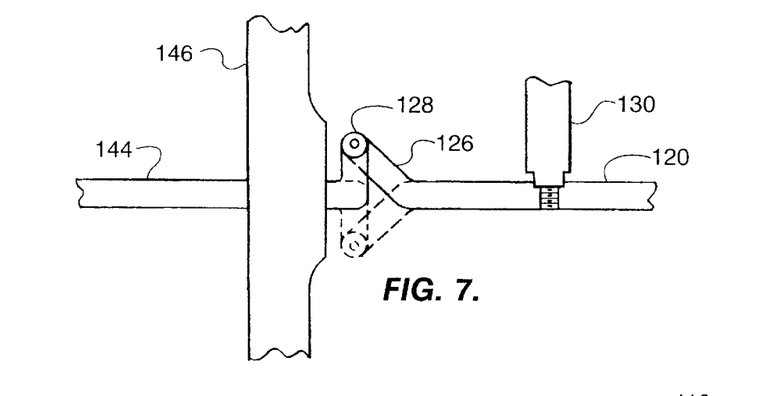
FIG. 7 is a top view of a portion of the apparatus illustrated in FIG. 6.
Figure 8:
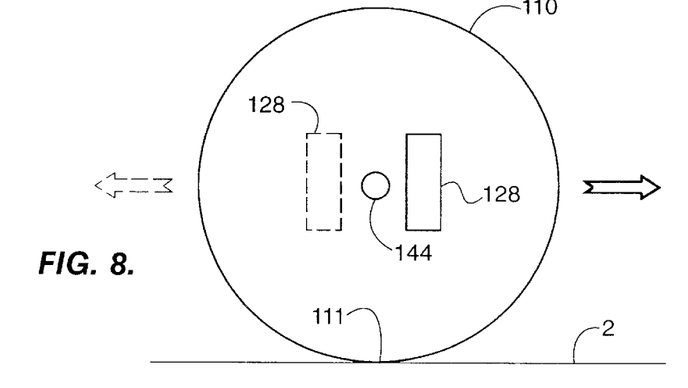
FIG. 8 is a schematic representation of a portion of the apparatus of the present invention illustrated in FIGS. 6 and 7.

Referring now to FIGS. 6, 7, and 8, a rotating kingpin embodiment is illustrated. Reference will also be made to FIGS. 1 and 2 for the following discussion.

FIG. 6 is a front elevational schematic representation of the front portion of the apparatus 10, showing the bed or platform 12 disposed on a frame 11. The shock absorber elements 70 and 74 are schematically represented.

Front wheel spindles 114 and 144 are shown in FIG. 6, while the spindle 144 alone is shown in FIGS. 7 and 8. In FIG. 6, brake rotor 116 associated with the spindle 114 and the brake rotor 146 associated with the spindle 144 are also shown. The brake rotors are used to move the king pins in one embodiment, as will be explained below. In FIG. 7, which is an enlarged schematic view of a portion of the apparatus illustrated in FIG. 6, also shows the rotor 146 and its backing plate and the spindle 144.

A rotatable shaft 120 extends between a pair of king pins 124 and 128, which king pins 124 and 128 are respectively associated with the spindles 114 and 144. The spindles 124 and 128 are secured to the shaft 120 through a pair of yokes 122 and 126, respectively. The yokes 122 and 126 extend from the rotatable shaft 120. The yokes 122 and 126 are, essentially, a pair of offset yoke elements to which the respective king pins are secured.

A motor 130 is shown adjacent to the shaft 120. The motor 130 rotates the shaft 120 to in turn rotate the yokes 122 and 126 to cause the king pins 124 and 128 to rotate between their forward and aft locations. In the forward position of the king pin 128, as illustrated in FIG. 7, the trailer moves forward, as illustrated by the solid arrow adjacent to the king pin 128 and its yoke 126. When the rotatable shaft 120 is moved in the opposite direction to cause the yoke 126 to rotate the king pin 128 to the position illustrated in dash dot line, the king pin is in position to allow the trailer apparatus to move backwards in a very simple manner with the tires 140 and 110 and their respective rims 142 and 112 (See FIGS. 3 and 10), secured to the spindles 144 and 114, respectively, to facilitate the backing up of the trailer apparatus 10.

FIG. 8 is a schematic representation illustrating the rotating king pin embodiment of FIGS. 6 and 7. The spindle axis 144 and the tire 110 are illustrated relative to the ground 2. The king pin 128 is illustrated as being disposed in front of the axis of the spindle 144, which position is the normal position for moving the trailer forwardly, as indicated by the relatively large arrow.

The king pin 128 may be rotated from its position shown in solid line in FIG. 8 to the position shown in dash/dot line in FIG. 8 for backing the trailer up. That is, the rotation of the king pin from the forward location, shown in solid line, to the rearward position shown in dash/dot line, allows the trailer to be backed up easily and conveniently. Thus, the king pin rotates from a forward position to a rearward position relative to the axis of the spindle 144 and the tire 110.

Figure 9:
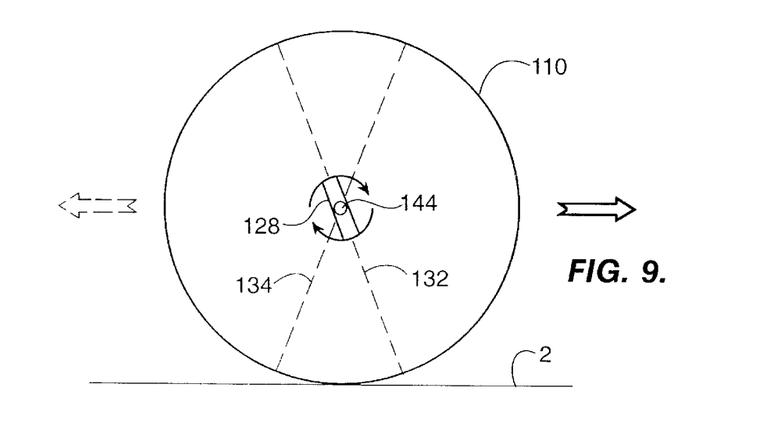
FIG. 9 is a schematic representation of an alternate embodiment of the apparatus of the present invention.

FIG. 9 schematically illustrates a tilting king pin embodiment. The tilting of the king pin 128 with respect to the tire 110 is schematically illustrated. The tilting king pin is the second embodiment of king pin manipulation of the present invention. The tire 110 is shown disposed on the ground or surface 2, with the tilt axis of king pin 128 in the center of the tire 110. Two longitudinal axes of the king pin 128 are illustrated, with a forward axis 132 used when the trailer is moving forward, as illustrated by the large arrow adjacent to the tire 110 on the right, and a rearward axis 134 used when the trailer is moved backwardly is shown by the large dash arrow adjacent to the tire 110 on the left.

The king pin 128 may be tilted mechanically, as by the motor 130 coupled to a shaft (not shown) to which the king pin 128 is secured, or it may be tilted pneumatically, as by a pneumatic cylinder, such as indicated in FIG. 5 by reference numeral 150. Such structural arrangements are well understood.

Figure 10:
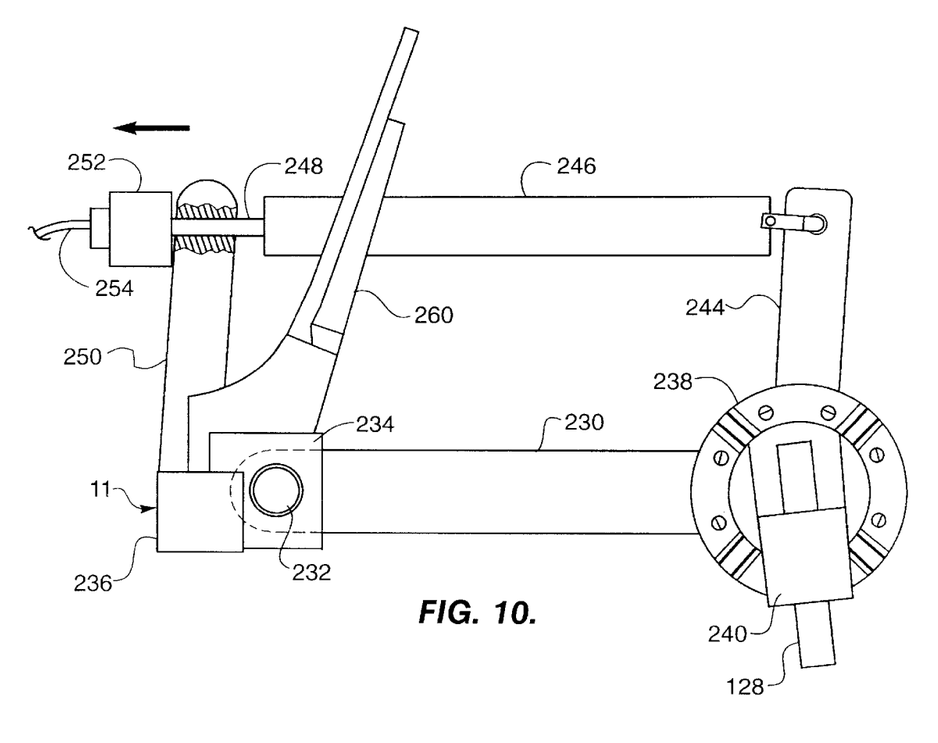
FIG. 10 is a schematic representation of associated structure for the embodiment of FIG. 9.

FIG. 10 comprises the schematic representation, with a portion in partial section, of the tilting king pin embodiment illustrated in FIG. 9, and illustrating two features, featuring what may generally be referred to as a parallelogram suspension arrangement and also an actuation mechanism for tilting the kingpin 128.

In FIG. 10, a suspension arm 230 is shown. The suspension arm pivots on a rod 232 which is secured to a block 234, and the block 234 is in turn secured to a frame member 236. The frame member 236 is, of course, a portion of the trailer frame 11.

At the outer end of the suspension arm 230 is an axle housing 238. The axle housing 238 is appropriately rigidly secured to the suspension arm 230. The axle housing 238 comprises a housing for a rod to which is secured a wrist pin 240. Extending through the wrist pin 240 is the king pin 128.

Secured to the opposite end of the wrist pin 240, on the opposite end of the axle housing 238, is a tilt lever 244. Movement of the tilt lever 244 results in movement of the wrist pin 240 and accordingly the king pin 128 tilts between two orientations, the orientation illustrated in FIG. 10 and an opposite tilt. As illustrated in FIG. 10, the forward direction of the trailer or frame 11 is to the left, and accordingly the tilt of the king pin 128 corresponds to the longitudinal axis 134 of the king pin 128 as illustrated in FIG. 9.

An upper arm 246 is appropriately pivotally secured to the actuating arm 244. The upper arm 246 is generally parallel to the suspension arm 230.

At the opposite end of the upper arm 246 from the tilt lever 244 is a fixed arm 250. The arm 250 is appropriately fixedly secured to the frame 11. A rod 248 is secured to the upper arm 246. The rod 248 extends through a bore in the fixed arm 250. An actuator 252 is secured to the fixed arm 250 and the rod 248 extends to the actuator 252. Extending from the actuator 252 is an element 254. If the actuator 252 is a pneumatic actuator, the element 254 may be a conduit. If the actuator 252 is an electric motor, or the like, the element 254 may be a conductor, etc.

The arms 244 and 250 are generally parallel, as are the arms 230 and 246, as referred to above. Thus, the elements 230, 244, 246, and 250 comprise, generally a parallelogram. The parallelogram in turn comprises a suspension for the wheel (not shown) and the king pin 128 which allows the king pin 128 to maintain its orientation regardless of the up and down movement of the wheel due to the road irregularities.

The tilting of the king pin 128 by way of the tilt lever 244 and the arm 246 and rod 248 results in a slight change in the parallel orientation of the fixed arm 250 and the tilt lever 244. However, such lack of true parallelism is generally immaterial, and thus the four members 230, 244, 246–248 and 250 still may be referred to as a parallelogram.

Also secured to the suspension arm 230 and its rod 232 is a bracket 260. The bracket 260 is similar to a bracket 204, which will be discussed below in conjunction with a suspension system 200.

Figure 11:
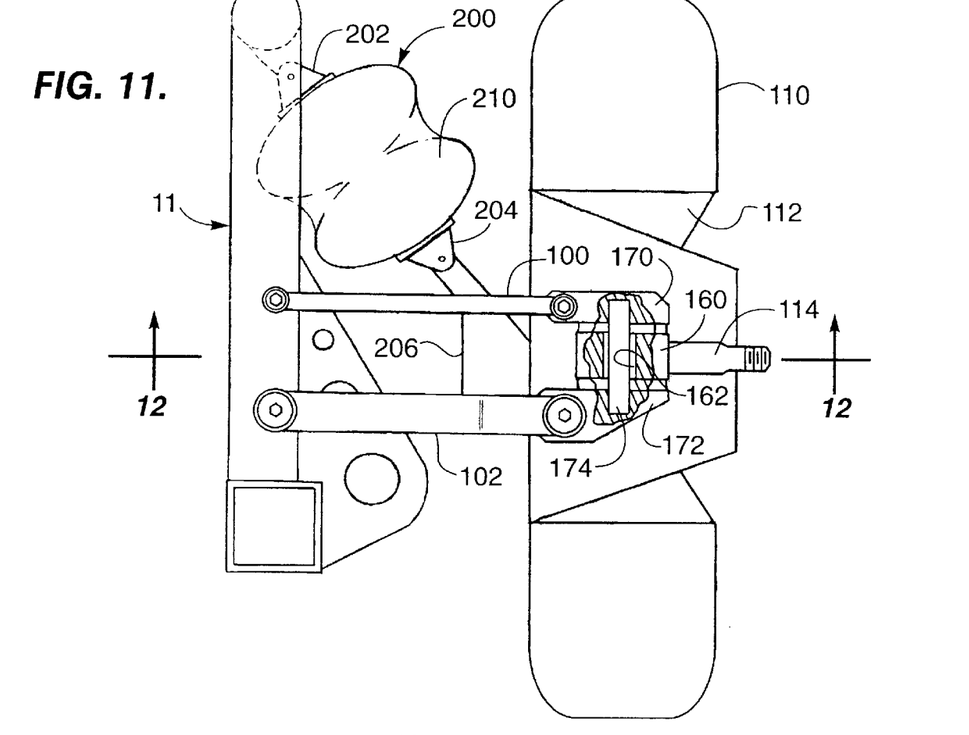
FIG. 11 is a front elevational view of a portion of the apparatus of the present invention illustrating another alternate embodiment of the apparatus of the present invention.

A third embodiment, a sliding king pin embodiment, is illustrated in FIGS. 10 and 11. FIG. 10 is a schematic view illustrating the elements associated with the sliding king pin. FIG. 10 is a front elevational view looking rearwardly through the tire 110, its rim 112 and its associated spindle 114. A portion of the frame 11 is also illustrated in FIG. 10, including a pair of links 100 and 102 which extend from the frame to the king pin elements. The links 100 and 102 allow the frame 11 to move upwardly and downwardly in response to air pressure in the shock absorber elements, as discussed above.

Figure 12:
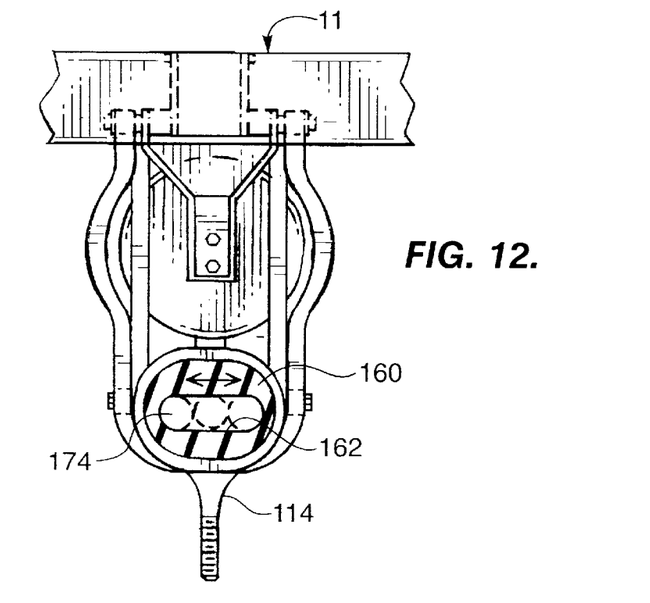
FIG. 12 is a view taken generally along line 11—11 of FIG. 9.

FIG. 12 is a top view looking downwardly taken generally along line 12—12 of FIG. 1. For the following discussion, reference will primarily be made to FIGS. 11 and 12.

The sliding king pin structure includes a pair of fixed plates 170 and 172 which are connected to the frame 11 through the links 100 and 102 and other elements, not shown. Between the plates 170 and 172 is a movable plate 160 which is secured to the spindle 114. The plate 160 includes a slot 162 in which is disposed a king pin 174. The king pin 174 is appropriately secured to the plates 170 and 172, while the plate 160 and its spindle 114 and, of course, the rim 112 and wheel 110 secured thereto, moves relative to the king pin 174.

When the towing vehicle (not shown) moves into reverse gear to back up the trailer apparatus 10, a solenoid (not shown) is actuated, locking the trailer brakes. That is, the rotors 116 and 146 (see FIG. 6) are momentarily locked, causing the tires 110 and 140 to remain in place. The backward movement of the trailer then causes the king pins, such as the king pin 174, to move rearwardly in the slot 162 of the plate 160. Another solenoid (not shown) locks the king pin 174 in the slot 162 and the brake locking solenoid releases, allowing the tires 110 and 140, and accordingly the trailer apparatus 10, to move backwardly.

The movement of the king pin 174 relative to the wheels allows the wheels to caster to move the trailer apparatus 10 backwardly very easily.

When the trailer apparatus 10 is to be moved forwardly, the reverse situation occurs. That is, when the gear shift is moved from reverse to a forward drive gear, the brake locking solenoids again are activated to lock the wheels 110 and 140, and the king pin locking solenoids release, allowing the kingpin 174 to move forwardly in the slot 162 in the plate 160. When the king pin 174 is at the forward position in the slot 162, the king pin locking solenoids again are activated to lock the king pin relative to the plate and the brake locking solenoids release, allowing the trailer apparatus 10 to move forwardly.

FIG. 11 also discloses a second embodiment of the shock absorber and lifting system employed in the apparatus of the present invention. In FIGS. 1 through 6, a generally vertically inverted shock absorber element is illustrated. In FIG. 10, an angularly oriented shock absorber and lifting system 200 is illustrated. The lifting and shock absorber system 200 includes a bracket 202 which is pivotally secured to the frame 11, a bracket 204 which is pivotally secured to an arm 206, with the arm 206 being secured to the wheel assembly. An expansible chamber element 210 is disposed between and appropriately secured to the brackets 202 and 204.

By increasing the air pressure in the element 210, the element 210 expands, thus causing the two brackets 202 and 204 to move relative to each other. This in turn causes the frame 11 to move upwardly. As air pressure is released from the element 210, the opposite occurs. The frame 11 is lowered relative to the tire 110.

In FIG. 11, the pneumatic conduit or line which routs air pressure to the element 210 is not shown. However, it is obvious that the same control system, including a conduit, valves, etc., as discussed above, apply also to the system 200.

It will be noted that the suspension elements associated with the system 200 are few in number, and accordingly less complex, than the structural elements associated with the vertical elements discussed above in conjunction with the embodiments of FIGS. 1–6. The principle is, of course, substantially the same. That is, increasing pneumatic pressure raises the trailer body evenly while decreasing the pneumatic pressure lowers the trailer body. The stiffness of the ride associated with shock absorbing capabilities of the system 200 is similarly adjusted by increasing or decreasing the pneumatic pressure in the element 210, and, of course, in its other elements associated with the other wheels of the trailer apparatus.

Since the pneumatic elements are disposed between the trailer body or frame and the wheel assemblies, the trailer body or frame may be lowered evenly and disposed on the ground or surface on which the wheels are disposed. This, of course, facilitates the loading of the trailer, regardless of what is to be loaded onto the trailer.

Subsequently, the lifting of the trailer body or frame is also accomplished evenly. The frame or body of the trailer maintains a level orientation during both the lowering and raising procedures to provide great flexibility in the load supported by the trailer apparatus. At the same time, the kind pin strcutures render trailering forwardly and backing greatly simplified and advantageous.

Referring again to FIG. 8, the tire patch for the tire 110 is represented on the surface 2. The tire patch comprises the length of the tire 110 on the surface 2, and is indicated by reference numeral 111.

It will be noted that the center of the tire patch 11 is illustrated as directly below the spindle 144. This is the normal location. However, the king pin 128 is in front of or behind the spindle 144, and thus the actual tire patch pressure will be manipulated by the location of the king pin, either forwardly or rearwardly, depending on king pin location, as discussed above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Trailer apparatus comprising in combination:
   a trailer frame, including a tongue and hitch for towing;
   a pair of front wheels, including a spindle for each wheel, secured to the frame; and
   king pin means secured to the frame and movable relative to the spindles of the wheels for trailering and backing the trailer frame, including
   a king pin for each wheel of the pair of wheels,
   a top plate secured to the trailer frame,
   a bottom plate secured to the trailer frame and spaced apart from the top plate,
   a middle plate secured to a spindle,
   a slot in the middle plate, and
   a king pin disposed in and movable in the slot and secured to the top and bottom plates, whereby movement of the trailer causes the kingpin to move in the slot.

2. The apparatus of claim 1 which further includes:
   a plurality of wheels secured to the trailer frame ,including the pair of frame wheels,
   pneumatic means disposed between the frame and the plurality of wheels and inflatable and deflatable for raising and lowering the frame relative tot he wheels and for absorbing road shocks as the trailer is towed.

3. The apparatus of claim 2; which further includes means securing the pneumatic means to the frame.

4. The apparatus of claim 3 in which the pneumatic means includes a pair of plates and an expansible chamber device disposed between the pair of plates.

5. The apparatus of claim 4 in which the pair of plates includes an upper plate secured to the frame and a lower plate secured to a wheel of the plurality of wheels.

6. The apparatus of claim 5 which further includes control means for controlling air flow into and out of the pneumatic means.

7. The apparatus of claim 6 in which the plurality of wheels includes four wheels, and the pneumatic means includes an expansible chamber device at each wheel whereby the frame means may be raised and lowered generally evenly and without tilting.

8. Trailer apparatus comprising in combination:

frame means for hauling a load, including a tongue for towing;

a plurality of wheels secured to the frame means, including a pair of front wheels each having a spindle;

pneumatic means disposed between the plurality of wheels and the frame means, including an expansible chamber device adjacent to each wheel and responsive to pneumatic pressure for raising and lowering the frame means relative to the plurality of wheels; and king pin means secured to the frame and movable relative to the spindles, including a king pin adjacent to each spindle for trailering and backing the trailer apparatus, including tilting the king pins.

9. The apparatus of claim 8 in which the spindles have an axis and the king pins include a longitudinal axis and an axis about which they tilt.

10. The apparatus of claim 9 in which the axis about which the king pins tilt is aligned with the axes of the spindles.

11. The apparatus of claim 8 in which the king pin means further includes a parallelogram for each king pin for compensating for road irregularities.

\* \* \* \* \*